(12) United States Patent
Kimura

(10) Patent No.: US 10,174,740 B2
(45) Date of Patent: Jan. 8, 2019

(54) WAVE-POWER GENERATION SYSTEM, AND TRANSMISSION BODY AND ROTATION CONVERSION UNIT USED THEREFOR

(71) Applicants: Mitsuteru Kimura, Miyagi (JP); NPO Renewable Hydrogen Network, Tokyo (JP)

(72) Inventor: Mitsuteru Kimura, Miyagi (JP)

(73) Assignees: Mitsuteru Kimura, Miyagi (JP); NPO RENEWABLE HYDROGEN NETWORK, Tokyo (JP)

( * ) Notice: Subject to any disclaimer, the term of this patent is extended or adjusted under 35 U.S.C. 154(b) by 173 days.

(21) Appl. No.: 15/025,368

(22) PCT Filed: Sep. 26, 2013

(86) PCT No.: PCT/JP2013/076034
§ 371 (c)(1),
(2) Date: May 16, 2016

(87) PCT Pub. No.: WO2015/045055
PCT Pub. Date: Apr. 2, 2015

(65) Prior Publication Data
US 2016/0265506 A1   Sep. 15, 2016

(51) Int. Cl.
*F03B 13/20*   (2006.01)
*F03B 13/18*   (2006.01)

(52) U.S. Cl.
CPC .......... *F03B 13/20* (2013.01); *F03B 13/1845* (2013.01); *Y02E 10/38* (2013.01)

(58) Field of Classification Search
CPC ......... Y02E 10/38; Y02E 10/28; F03B 13/20; F03B 13/1845

(Continued)

(56) References Cited

U.S. PATENT DOCUMENTS 3,758,788 A * 9/1973 Richeson ................ F03B 13/20
                                                                290/1 R
3,898,471 A * 8/1975 Schera, Jr. ............ F03B 13/186
                                                                290/42

(Continued)

FOREIGN PATENT DOCUMENTS

JP       06-171577       6/1994
JP       2010-525214     7/2010

(Continued)

OTHER PUBLICATIONS

International Search Report, PCT/JP2013/076034, dated Dec. 24, 2013.

*Primary Examiner* — Tulsidas C Patel
*Assistant Examiner* — Charles Reid, Jr.
(74) *Attorney, Agent, or Firm* — Young & Thompson

(57) ABSTRACT

A wave activated electric power generating system is durable even if exposed to a rainstorm, extremely simple in structure and highly efficient. A motion transfer medium rendering the rotary part of an electric generator less liable to produce slipping and a rotation transform member adapted to rotate while fitting with the motion transfer medium in movement are also provided. The system includes a buoy floating on the sea or lake so as to move up and down with the waves, and an underwater motion restrainer suspended underwater by water resistance, or submerged by its own weight on the sea or lake floor. Vertical movement of the buoy relative to the underwater motion restrainer is converted and transferred by the motion transfer medium in the form of an elongate rope vertically moving under the weight of an element to operate the rotary electric generator securely connected to the buoy.

19 Claims, 7 Drawing Sheets

(58) Field of Classification Search
USPC .................................................. 290/53, 42
See application file for complete search history.

(56) References Cited

U.S. PATENT DOCUMENTS

| | | | | |
|---|---|---|---|---|
| 4,110,630 A * | 8/1978 | Hendel | .................. | F03B 13/12 290/42 |
| 4,742,241 A * | 5/1988 | Melvin | ................ | F03B 13/187 290/42 |
| 4,883,411 A * | 11/1989 | Windle | .............. | F03B 13/1855 290/53 |
| 5,578,889 A * | 11/1996 | Epstein | .................. | F03B 13/14 290/53 |
| 6,864,592 B1 * | 3/2005 | Kelly | ................. | F03B 13/1855 290/42 |
| 7,845,880 B2 * | 12/2010 | Rasmussen | .............. | E03B 9/08 290/42 |
| 8,276,377 B2 * | 10/2012 | Patton | ................ | F03B 13/1865 290/42 |
| 2006/0208494 A1 * | 9/2006 | Cook | ..................... | F03B 13/20 290/53 |
| 2007/0138793 A1 * | 6/2007 | Zimmerman | ........... | F03B 13/20 290/1 R |
| 2009/0146429 A1 * | 6/2009 | Protter | ................... | F03B 13/16 290/53 |
| 2009/0211241 A1 * | 8/2009 | Moffat | ................... | F03B 13/22 60/501 |
| 2010/0084868 A1 * | 4/2010 | Shin | .................... | F03B 13/1865 290/53 |
| 2010/0084869 A1 | 4/2010 | Leijon et al. | | |
| 2010/0109329 A1 * | 5/2010 | Brantingham | ...... | F03B 13/1845 290/53 |
| 2010/0164227 A1 * | 7/2010 | Grassi | .................... | F03B 13/20 290/52 |
| 2010/0171312 A1 * | 7/2010 | Burns | .................... | B63B 22/00 290/53 |
| 2010/0230964 A1 * | 9/2010 | Sachs | ...................... | F03B 13/20 290/42 |
| 2011/0018275 A1 | 1/2011 | Sidenmark | | |
| 2012/0007363 A1 * | 1/2012 | Wang | ................. | F03B 13/1815 290/53 |
| 2012/0235413 A1 | 9/2012 | Piccinini | | |
| 2013/0082465 A1 | 4/2013 | Frich | | |
| 2014/0217735 A1 * | 8/2014 | Chen | .................... | F03B 17/061 290/53 |

FOREIGN PATENT DOCUMENTS

| | | |
|---|---|---|
| JP | 2011-512488 | 4/2011 |
| JP | 2013-503293 | 1/2013 |
| WO | WO 2012/005597 | 1/2012 |

* cited by examiner

WAVE-POWER GENERATION SYSTEM, AND TRANSMISSION BODY AND ROTATION CONVERSION UNIT USED THEREFOR

TECHNICAL FIELD

The present invention relates to a system for wave activated power generation. In particular, the invention relates to a wave activated electric power generating system having an electric generator as secured to a buoy floating on sea or lake water and in which when the electric generator is moved vertically up and down with waves of water, it is so moved relative to a underwater motion restrainer that is so suspended underwater as to be resistant to water and less subject to moving up and down (of underwater suspension type), or relative to an underwater motion restrainer that is submerged by connecting to an anchor installed in a water bottom and at rest there (of water bottom installation type), the electric generator being operated through an intermediary of a motion transfer medium such as a rope which is suspended underwater by a weight element vertically movable underwater and is thereby caused to reciprocate vertically. The invention also relates to such a motion transfer medium and to a rotation transform member as used in such a wave activated electric power generating system.

BACKGROUND ART

There have hitherto been systems using sunlight or wind force as a renewable energy source to generate electric power. Sunlight may significantly be available only in a sunshine duration and not so in a cloudy or rainy weather. Wind force power generation utilizes a current of air where there is a calm and which is basically small in density. Hence, these systems tend to be made in a large size. In contrast, the use of wave power in the ocean where there are seawater waves of large momentum having a wave height, e.g. of 1 to 2 meters always, is proposed as preferred to achieve or activate power generation in a smaller system size and an enhanced efficiency. Thus, there have heretofore been proposed a number of wave activated electric power generating systems to convert the kinetic energy of waves such as in the ocean into electrical energy. For example, there is known a power generating system in which wave force energy is converted into air energy to drive an electric generator via an air turbine. It is provided with an air chamber which vertically bends a horizontal water conduit, an air tank connected to the chamber and further a duct that communicates the tank with the atmosphere such that the turbine is rotationally driven by the air current in the duct (see Patent Reference 1). Since large energy of water waves is used only in the system to compress an identical volume of air which is small in momentum, the system needs to be made of a large size and must moreover be low in energy conversion efficiency.

There is also known a seawater turbine electric power generating system in which a floating body is moved vertically up and down with seawater waves, a piston connected to the floating body is vertically moved up and down in a cylinder, and seawater in the cylinder is fed into an air chamber both when the piston is moved up and when the piston is moved down (see Patent Reference 2). While there tends to be lack of uniformity in the flow of seawater fed to the air chamber from the cylinder, air in the air chamber acts as a cushion so that the lack of uniformity may sufficiently be removed to allow electric power to be generated stably. While this system in which the use of a seawater flow of large momentum increases the conversion efficiency, needs to securely connect the cylinder for supporting the piston moving vertically up and down and connect it to a bottom of the sea or to a quay wall, it has a problem of its durability.

There has hitherto also been known a wave activated electric power generating system comprising a floating body so formed as to be moored and shaped in the form of a long cylinder, an electric generator with which the floating body is provided, a ballast mounted to a lower end of the floating body, a buoyancy adjusting chamber disposed in a middle region of the floating body and at a position remote from the ballast, the buoyancy of the buoyancy adjusting chamber being adjusted to cause the floating body to be floating vertically, an air chamber disposed at an upper end of the floating body, an upper part of the floating cylinder body being made less uneven to reduce water resistance to vertical movement of the floating body, a protrusion provided at a lower part of the floating body to increase water resistance, an air turbine utilizing an air current produced by the vertical movement of the surface of water between the inside and outside of the air chamber, and an electric generator disposed at an upper end of the floating body for rotational driving by the air turbine (see Patent Reference 3). In this system, it is assayable that the unit need not necessarily be secured to a bottom of the sea or a quay wall, that adjusting the buoyancy of the buoyancy adjusting chamber disposed in the middle region of the floating body makes the unit floating on the sea and the floating body is provided with a protrusion that makes the floating body less liable to move against the undulating motion of waves. However, converting the energy of seawater waves having large momentum to the air current of small momentum to activate power generation with an air turbine leaves the conversion efficiency low. Further, shaping the floating body in the form of an elongate cylinder leaves the problem unsolved that a severe rolling may be caused by a side wave in a violent storm such as of a typhoon.

There has hitherto been also known a wave activated electric power generating system using a tightly sealed buoy and an oscillator connected via a spring to an inner wall of the buoy and in which motion of the oscillator relative to the buoy floating on the waves in the ocean and vertically oscillating is utilized whereby an electric generator secured to the oscillator is rotationally driven with a pinion in mesh with a rack (see Patent Reference 4). In this system, the electric generator is stored in the tightly sealed buoy and protected from seawater and the structure is well durable. It is, however, necessary to adjust the resonance frequency between the spring and the oscillator. Since the resonance frequency varies with a load for power generation, stable oscillations can hardly be obtained. With a rolling by waves, the buoy tends to incline, bringing about the problem of changes in resonance frequency of the electric power generating system and a lowering of power generating efficiency.

There has also been known heretofore a wave activated electric power generating system having a floating body vertically moving up and down with undulations on the surface of the sea and in which electric power is generated using a backing movement produced at a portion of rotary shaft fitted in a bearing of the floating body and having a mooring member for connection to and mooring via a wire rope an anchor placed on a bottom of the sea (see Patent Reference 5). This requires a part of mooring to be installed on a bottom of the sea and involves a problem of its construction and selection of a site of installation. There has also been known heretofore a wave activated electric power generating system in which an undulation of waves is converted into a vertical up and down movement of a float (or ship) and utilizing the principle of a leverage for an undulation of waves, compressed air is produced by a hydraulic unit and utilized to operate a turbine electric generator (see, for example, Patent Reference 6). In this system, the leverage is hard and long, increasing the distance up to a position where the turbine electric generator is secured, giving rise to the problem of durability, such as of making a part liable to break by a storm such as a typhoon.

There has also been known heretofore a wave activated electric power generating system (see Patent Reference 7) in which a linear electric generator as the wave energy converter is provided in a floating member as the buoy and including an elongate support structure in the form of a vertically oriented column having a submerged member provided below an average draft line, the support structure being vertically oscillated with waves with respect to the floating member to operate the linear generator, taking out electric power into the outside. In this system, since the submerged member is preferably not moved with the waves, the rotary electric generator is placed in the submerged member. A tension mooring system is utilized comprising a cable extending to a balancing means adapted to be suspended from the submerged member via a pulley mechanism 54 from a ballast means 52. There has been a proposal to make the submerged member less liable to move with the waves by utilizing an electromagnetic brake of the rotary electric generator operated when it is varied vertically to cause an electric current to flow through an electric load. It has also been proposed preferably to use a battery. In such proposals, however, it is the function of the rotary electric generator to make the submerged member less liable to move. It is by the linear electric generator mounted in the floating member that electric power is generated for taking out outsides. It is mostly the floating member that is vertically oscillated with the waves. The submerged member, which is at all underwater and made by water resistance less liable to move and is further made less liable to move by using the electromagnetic brake of a rotary electric generator whose quantity of electric generation is small at all. Furthermore, the rotary electric generator which is arranged stored in the submerged member and dipped in seawater, have given rise to the problem of its durability and electrical leak.

There has hitherto been also known a wave activated electric power generating system (see Patent Reference 8) in which the wave energy converter has a tetrapod (trade mark) or wave-dissipating concrete block placed on a bottom of the sea and connected to one end of a chain of short link whose other end has a weight attached thereto, the short-link chain being engaged with a sprocket with which a float is provided whereby the float moving up and down simultaneously as the surface of the sea is up and down turns the sprocket, to rotate an electric generator and in which a reversible unit is provided to rotate the electric generator unidirectionally. The reversible unit is complicated, has low efficiency and may cause a failure. The short-link chain extending in seawater tends to have living things such as shells in the sea, seaweeds and other foreign matters attached thereto, preventing its engagement with the sprocket. Further, the problem arises that a large shake of the float and the short-link chain in raging waves in a storm such as a typhoon may cause the weight to move largely, disengaging the sprocket from the chain.

PRIOR ART REFERENCES

Patent Reference

Patent Reference 1: JP 2012-002 218 A
Patent Reference 2: JP 2011-021 590 A
Patent Reference 3: JP 2006-097 633 A
Patent Reference 4: JP 2007-297 929 A
Patent Reference 5: JP 2006-226 274 A
Patent Reference 6: JP 2005-188 493 A
Patent Reference 7: JP 2009-542 964 A
Patent Reference 8: JP H 11-006 472 A

SUMMARY OF THE INVENTION

Problems to be Solved by the Invention

A wave activated electric power generating system for installation on the sea is firstly required: if exposed to a heavy rainstorm such as in a typhoon and under strong seawater wave energy, to have a structure that is less liable and hard to be broken. In this sense, a wave activated electric power generating system moored or connected to a nearby quay wall or embankment or the like is charged with danger of colliding thereon and has the problem of durability. Also, an electric generator if not structured to protect from seawater, causes problems of lack of durability and electrical leak. An electric power generating system is sought which solves these problems, which is durable and which is efficient. Problems of if a system installed, if large-sized, on the ocean affects the scenery and a fishery right must also be taken into consideration.

The energy of waves in the vicinity of a surface of water where the waves undulate can be parted into energy of vertical oscillations and energy of horizontal oscillations wherein it is known that water molecules in a combination of vertical and horizontal oscillations are moved rotationally. It is also known that the rotational movement of water in the waves which create an undulation closer to the water surface is of a radius which is reduced rapidly as the depth from the water surface is increased and which is reduced drastically with the depth as the depth becomes equal to or more than one half of the wavelength of the wave undulation, having water not moving vertically and leaving only the component of horizontal oscillations.

The present invention aims, and has an object, to solve the foregoing problems by providing a wave activated electric power generating system in which utilizing a radius of rotation of water in waves which is reduced sharply as the depth of water from a water surface is increased, an underwater motion restrainer is placed underwater in a region (underwater suspension type) where the influence of the waves is reduced, or is placed on a bottom or floor of the sea (bottom of the sea installation type), a buoy floating on the waves and oscillating in undulation (primarily, vertically moving up and down) relative to the underwater motion restrainer, and through the intermediary of a weight suspended underwater and a transfer medium in the form of a rope, electric power generation is activated with an electric generator securely connected to the buoy, and which eliminates the need to provide a reversible unit, which allows an alternating current output generated to be transmitted as it is, which is with a minimum of failure, which is durable, which makes suspended matters less liable to attach to a portion, that is immersed in seawater, of the transfer medium moving vertically up and down, which prevents the transfer medium in the form of a rope and having a weight suspended underwater from having an extraordinarily large run-out and coming off a rotor of the electric generator and which is extremely simple in structure and is of a small or reduced size.

Means for Solving the Problems

In order to achieve the object mentioned above there is provided in accordance with the present invention a wave activated electric power generating system, characterized in that:

it comprises at least, a buoy to be floating on water waves, an electric generator 2 adapted to be secured to the buoy, a rotation transform member 5 for rotating a rotor of the generator to cause the generator 2 to generate electric power, a flexible and elongate motion transfer medium 6 for rotating the rotation transform member 5, a weight element 7 to be suspended underwater as held by the motion transfer medium 6 and an underwater motion restrainer 8 so adapted and constructed as to provide a resistance to its motion underwater, wherein the said underwater motion restrainer is of underwater suspension type, being of its own weight so as to sink underwater but lighter in weight than the said weight element 7 so as to be suspended underwater, and to be resistant underwater and less subject to its oscillating vertically underwater, and includes a guide means 80, 81 for the motion transfer medium 6 moving up and down, the said motion transfer medium 6 has an end having the said weight element 7 to be tied thereto, and an opposite end having the said underwater motion restrainer to be tied thereto, and further the said underwater motion restrainer and the said weight element 7 so that they may not be spaced from each other by a distance of a predetermined length or more are tied together with flexible wire 60 whereby when the said buoy is undulately oscillated following an undulatory oscillation of water that creates waves, substantially no motion created of the said underwater motion restrainer under water resistance causes the said weight element 7 then to be relatively moved principally vertically up and down and in turn the rotor of the said electric generator 2 to be rotated for power generation, by and through the motion of said motion transfer medium 6.

Water waves, for example, ocean waves as a result of synthesis of vertical and horizontal oscillations cause rotational movement of seawater in the vicinity of a surface of water, bringing about a swell or undulation of waves. Hence, the buoy floating on the waves along with wave undulations has not only vertical oscillations but also a horizontal reciprocating movement. The wavelength of seawater, depending on the velocity of wind, is generally several tens meters. At a depth of its one half or more in the sea which is a region less susceptible to influences from such surface waves, an underwater motion restrainer that is resistant to its moving underwater is suspended in the seawater by a motion transfer medium 6 in the form of a rope extending from the electric generator secured to the buoy. With the buoy oscillating principally vertically along with undulations of waves, the underwater motion restrainer is rendered less liable to move by water resistance and its own weight. Thus, the motion transfer medium 6 in the rope form having its one end having the underwater motion restrainer suspended therefrom underwater is turned round a region of the electric generator 2, extending through the underwater motion restrainer to its opposite end having a weight element 7 suspended therefrom underwater. The weight element 7 is lifted up and down by the rope medium 6 with the floating buoy raised and lowered during wave undulations. The reciprocal motion of the motion transfer medium 6 is contrived to rotate the rotor of the electric generator 2 to generate electric power in a unit movable with the buoy. To mention more specifically and in further details, the buoy loaded with the electric generator 2 is undulately oscillated (not necessarily vertically only) along with waves and relative to the underwater motion restrainer. While the buoy is raised to reach a top of the waves, the buoy and the underwater motion restrainer substantially at rest is spaced from each other by an increasing distance and the motion transfer rope medium 6 is pulled by the restrainer to move then to the left (where as shown) in the region of the generator while lifting the weight element 7 up via the rope medium 6. Thereafter, while the buoy is lowered to reach a trough of the waves, the distance between the buoy and the underwater motion restrainer is reduced to reach a minimum and the motion transfer rope medium 6 is pulled by the weight element 7 moving down to move then to the right (where as shown) in the region of the generator while the underwater motion restrainer is maintained substantially at rest via the rope medium 6. A reciprocating motion of the motion transfer rope medium produced in such a manner operates the electric generator 2. Further, the motion transfer rope medium 6 is provided with a guide means 80, 81 which imparts restraints to movement of the motion transfer rope medium 6 so that in raging waves such as in a typhoon the weight element 7 may not extraordinarily separate from the buoy and may not come off the rotor of the electric generator 2. It should be noted here that the buoy need not be single but may comprise a plurality of small buoy elements connected in parallel and combined together to provide a desired buoyancy in total.

As the rope-shaped motion transfer medium 6 is moved axially in reciprocation, the rotor of the electric generator 2 is rotated in reciprocation, providing an electric current that is alternating of which a frequency is determined by a period of undulations of waves. The period of wave undulations amounts to several ten seconds, and a rotation transform member such a pulley mounted to the rotor of the electric generator 2 can in general be rotated slowly. And, the waves have a wave height of a degree of 1 to 2 m (meters) in general. The oscillatory movement of the rope-shaped motion transfer medium 6 is of an amplitude of this degree In general. Since an actual speed of rotation of the rotor determines an electric power generated, a speed of rotation transform mechanism (also known as a rotational speed transform mechanism) with the gear ratio varied can be provided to raise the speed of rotation of the rotor suitably. However, the wave height may momently vary so that the amount of power generation may vary accordingly, giving rise to the problem that it is hard to generate an alternating current that is stable with time. To solve the problem, it is recommended that an AC power generated be rectified into a DC (direct current) which can be stored on a battery.

A wave activated electric power generating system according to the present invention may be implemented as set afloat on a lake using lake water whose wave height is generally low, however. It is preferred in power generation to set the system afloat on the ocean, utilizing sea water which has undulations of high wave height and having large kinetic energy.

In a system of underwater suspension type in which an underwater motion restrainer is suspended underwater as mentioned supra, a weight element 7 is used that is heavier than the underwater motion restrainer. In the case where waves are small or gentle, it is presumed that the underwater motion restrainer may be lifted up by the weight element 7 and may be positioned closer to the buoy so that it can be exposed to a wave undulation or swell. Accordingly, the weight element 7 and the underwater motion restrainer may be tied together with flexible wires 60 so that when the weight element 7 is allowed to move down or lowered, the wires 60 prevent the weight element 7 from lowering or moving down more than a predetermined depth. To wit, adjustment of the length of wires 60 determines a maximum distance between the weight element 7 and the underwater motion restrainer.

The underwater motion restrainer is designed to be restored to (sunk at) a predetermined position thereof under water by the weight element 7 and the flexible wires 60. It need not necessarily be made heavier than water. But, when the restrainer tends to be lifted up by the buoy, there exists a water resistance that acts to resist this upward movement; it is preferred that it be made heavier than water so that it may sunk by its own weight. The motion transfer medium 6 cannot be moved vertically up and down unless the weight element 7 underwater is sufficiently heavier in weight than the underwater motion restrainer. In a preferred form of implementation, the underwater motion restrainer underwater is made a little heavier in weight than water and the weight element 7 underwater is equal to a degree of one half of the buoyancy of the buoy floating on water as loaded with the electric generator and all its associated components. It should also be noted that the weight element 7 is preferably shaped so as to be streamlined so that it may be less resistant to water when it is moved vertically up and down.

When the underwater motion restrainer is being lifted up by the buoy floating on wave of water, a negative pressure is created in its lower region, into which water is drawn to flow from the periphery of the underwater motion restrainer, the flow creating a vortex (Karman's vortex) that becomes resistant to water moving upwards of the underwater motion restrainer. So that the vortex may largely be created to increase water resistance, the underwater motion restrainer is preferably formed peripherally with a peripheral projection to further restrain the vertical movement underwater.

The wave activated electric power generating system described above is basically a system set to float by a buoy on water. In order to prevent the system from being drawn to flow with the ocean current, the present wave activated electric power generating system is preferably moored to such as a land or a bottom of the sea, e.g. a site not to move with any ocean current. The mooring system to this end may make use of an anchor as that a ship is moored on the ocean.

In accordance with the present invention there is also provided a wave activated electric power generating system, characterized in that:

it comprises at least, a buoy to be floating on water waves, an electric generator 2 adapted to be secured to the buoy, a rotation transform member 5 for rotating a rotor of the generator to cause the generator to generate electric power, a flexible and elongate motion transfer medium 6 for rotating the rotation transform member 5, a weight element 7 to be suspended underwater as held by the motion transfer medium 6 and an underwater motion restrainer so adapted and constructed to provide a resistance to its motion underwater, wherein the said underwater motion restrainer is of water bottom installation type, connecting to an anchor installed in water bottom so as to be sunk underwater to lie on the bottom of water such as bottom of the sea, and made resistant and less subject to its oscillating vertically underwater, and includes a guide means 80, 81 for the motion transfer medium moving up and down, and the said motion transfer medium 6 has an end having the said weight element 7 to be tied thereto, and an opposite end having the said underwater motion restrainer to be tied thereto, whereby when the said buoy is undulately oscillated following an undulatory oscillation of water that creates waves, substantially no motion created of the said underwater motion restrainer under water resistance causes the said weight element 7 along with the said motion transfer medium 6 then to be moved principally vertically up and down and in turn the rotor of the said electric generator 2 to be rotated for power generation, by and through the motion of the said motion transfer medium 6.

The underwater motion restrainer of water bottom installation type which is made heavier than the buoyance of the said buoy and the weight under water of the weight element 7 and thereby sunk such as on a floor of the sea and is made less liable to be oscillated vertically by its own weight, is substantially immobile underwater. This wave activated electric power generating system operates as essentially does the system of underwater suspension type and a repeated description in detail of the operation is omitted here. It may be noted, here, that in the underwater suspension type, the underwater motion restrainer and the weight element 7 are tied together in structure with flexible wire 60 so that they may not be spaced apart from each other by a preselected distance or but, in the water bottom installation type, the underwater motion restrainer is left sunk on a floor of the sea so that it may not be lowered further, tying with the flexible wire is not necessarily required. Note also that as in the previous form of implementation, the buoy need not necessarily be single but comprises a plurality of small buoys tied in parallel whose buoyancies are totaled to provide a desired buoyancy.

For installation in the ocean the wave activated electric power generating system is preferably of underwater suspension type in which the underwater motion restrainer is suspended underwater, if the sea is deep (having a depth of more than several tens meters). However, if the sea is so shallow as to have a depth of less than several tens meters, a floor of the sea can be utilized. Then, the bottom of sea installation type is preferred using an underwater motion restrainer having its own weight which underwater is sufficiently heavier than the buoyancy of the buoy and the weight of an weight element 7. It is set sunk on the sea floor, making it possible to create the state that regardless of sizes of waves or surges, the underwater motion restrainer stands substantially immobile. Then, of course, the weight element 7 under the buoyancy of the buoy floating on water is lifted up and lowered down with undulating oscillations of waves of water through the elongate rope-shaped motion transfer medium 6. In coupling therewith, the electric generator is operated.

The present invention also provides a wave activated electric power generating system wherein the said buoy is divided into a plurality of buoys which are so coupled together to give rise to a desired buoyance, and the electric generator (2) is securely connected to said buoys coupled together.

With a single buoy, an electric generator 2 so that it may be secured thereto in the state that they may not be exposed to seawater or rainwater, is conveniently stored in the buoy. This, however, gives rise to limitations in the diameter of the buoy and the size of the generator. Using a plurality of smaller buoys coupled together to yield a desired buoyancy eliminates the need to store the generator in the buoy and allow mounting the generator so that it lies above the sea (the surface of seawater). It can also be covered in a casing such as not to be exposed to seawater or rainwater. A less costly buoy can be provided, providing a less costly wave activated electric power generating system.

The present invention also provides a wave activated electric power generating system wherein the guide means 80, 81 has a limiting or guiding function to allow the motion transfer medium 6 oscillating vertically to be moved only in a limited range, and provide a foreign matter removing function to remove a foreign matter (180) attached to the motion transfer medium 6.

The elongate motion transfer medium 6 is provided with the guide means 80, 81 having: a limiting or guiding function to restrict movement of the motion transfer medium 6 and to allow it to move in a predetermined range so that in raging waves such as in a typhoon, the buoy and the weight element 7 may not extraordinarily be run out, the weight element 7 may not be separated too far from the buoy and the elongate motion transfer medium 6 connected thereto may not come off such as a pulley directly connected to the rotor of the electric generator 6; and a foreign matter removing function to remove from the elongate motion transfer medium 6 foreign matters such organisms as a shell in seawater, algae and seaweed or suspended matters which may cause the elongate motion transfer medium 6 to come off such as a pulley directly connected to the rotor of the electric generator 2, may prevent the motion transfer medium from moving smoothly and may be a cause to bring about a failure of the medium or others.

The present invention also provides a wave activated electric power generating system wherein so as not to be exposed to water the electric generator 2 is structured to lie in a casing 200.

Producing electricity, an electric generator if exposed to such as seawater involves a risk of electrical leak, and also that of corrosion, deteriorating its durability. Hence, it is necessary that at least the electric generator be covered with a casing so that it may not be exposed to, and may be thereby protected from, the seawater. Here, at least the electric generator 2 is structurally covered with a casing 200 and stored therein. Of course, not only the electric generator 2 but also a rectifier and battery may be stored together in the casing 200. The casing 200 if possibly sealed hermetically can be used as the buoy and can also serve as an auxiliary buoy.

The present invention also provides a wave activated electric power generating system wherein the said motion transfer medium 6 is in the form of an elongate rope or belt.

The motion transfer medium 6 extending in two ways from the rotation transform member 5 has its one end fastened to the underwater motion restrainer and its other end having the weight member 7 suspended from it in seawater. As the buoy is moved undulating with waves, the motion transfer medium 6 is reciprocated to rotate the rotation transform member 5 fitted to the electric generator 2, thereby contributing to generation of electric power. The motion transfer medium 6 may be a rope of twisted nylon yarn or of carbon fibers. It may be in the form of a chain. The motion transfer medium 6 may also be of a tough metallic wire that is corrosion-resistant and flexible. Also, a wave activated electric power generating system set afloat on the ocean may be exposed to a typhoon or storm in which the buoy is not only vertically and horizontally oscillated but also rotationally moved. With at least the weight element 7 suspended in seawater, the rope-shaped motion transfer medium 6 is vertically reciprocated while being rotationally deflected or twisted. In order that a motion transfer medium 6 vertically reciprocating while so deflecting or twisting may firmly be stayed in a rotation transform member 5 to rotate the rotation transform member smoothly, it has been found desirable that the elongate rope-shaped motion transfer medium 6 have a shape in cross section that is diametrically symmetrical and approximately circular.

The motion transfer medium 6 may also be in the form of a belt. Especially as a timing belt, it may be made large in friction and less liable to slip with the uneven surface formed on the pulley.

The present invention also provides a wave activated electric power generating system wherein the rotation transform member 5 comprises a pulley or gear.

A pulley constituting the rotation transform member 5 should have a frictional surface such as not to slip and is preferably provided laterally with a pulley guide for the motion transfer medium 6 so that the motion transfer medium 6 may not come off the pulley.

A gear or sprocket constituting the rotation transform member 5, the transfer medium 6 is preferably formed of a chain or timing belt in mesh with the gear or sprocket. The chain may not be of a metal.

The present invention also provides a wave activated electric power generating system wherein the electric generator 2 has a rotor rotatable at a speed of rotation that is varied from that of the rotation transform member 5 by a speed of rotation transform mechanism also known as a rotational speed transform mechanism 9.

In general, wave undulations of the ocean has a period of several ten seconds and a wave amplitude of a degree of 2 meters. Thus, the rope-shaped motion transfer medium 6 in a wave activated electric power generating system floating on the sea according to the present invention is moved slowly having an amplitude of 2 meters under a large force of buoyancy of the buoy and a weight of the weight member 7. Then, depending on the diameter of a pulley of the rotation transform member 5, its speed of rotation is not necessarily large. Since the output of the electric generator 2 is greater as the speed of rotation of the rotor is greater, it is desirable that a speed of rotation transform mechanism (a rotational speed transform mechanism) 9 be used such that the speed of rotation of the rotation transform member 5 is converted to an increased speed of rotation of the rotor of the electric generator 2.

In the speed of rotation transform mechanism (the rotational speed transform mechanism) 9, the speed ratio can be adjusted by selecting a combination of the diameters in size of a plurality of gears and also utilizing a friction between a belt and a magnetic gear. If a gear is utilized, there can be provided a sliding mechanism and it is important to ensure that if a large force is applied, it can be slipped.

The present invention a wave activated electric power generating system wherein a rectifier 40 is included for rectifying an alternating current from the electric generator 2 into a direct current.

In a wave activated electric power generating system, the state of wave undulations varies momently depending on such wave undulations; hence, it is difficult to obtain a stable output of alternating current from the electric generator 2. According to an aspect of the present invention, it is preferred that an alternating current generated by the electric generator 2 be converted into a direct current through the rectifier 40. The rectifier 40 is secured, together with the electric generator 2, to the buoy and preferably stored in the casing 200.

The present invention also provides a wave activated electric power generating system wherein a battery 50 is mounted for storing the direct current via the rectifier 40.

An AC power from the electric generator 2 or a DC power converted from the AC power by the rectifier 40 may as it is be output into the outside. In a form of implementation of the invention, the battery 50 may be mounted for charging through which the DC power can be taken out into the outside. A charged battery may be made exchangeable with an uncharged battery and may be carried out into the outside from which a power can be taken out. Preferably, the battery 50 should, together with the rectifier 40, be secured to the buoy.

The present invention also provides a wave activated electric power generating system wherein a cable 25 is included for taking out an electric power generated from the electric generator 2 into an outside area.

There are a variety of ways by which an electric power generated in the electric generator 2 is taken out into the outside. Taking it out includes a way of taking an AC output out as it is from the electric generator 2 and a way of taking out a DC output converted from the AC output. The cable so that no electrical leak may occur needs to have a structure that ensures that an exposed portion thereof is not wet with water such as seawater. The casing hermetically sealed may have a waterproof connector 30 attached thereto from which the output may be taken out. Also, the cable may be a submarine or marine cable passing on seafloor or in or on water for transmission to a land.

The present invention also provides a wave activated electric power generating system wherein the said motion transfer medium 6 in the form of an elongate rope is formed periodically lengthwise on its surface with a corrugation (a recess and projection).

In general, a rotor rotated to pass an electric current through a load of the electric generator is braked by an electromagnetic brake acting to react the electric current. Electric power generation is effected by the rotor being rotated against braking by the electromagnetic brake. Since the motion transfer medium 6 imparts rotation to the rotor of the electric generator via the rotation transform member 5 to rotate the rotor having an electromagnetic braking action applied thereto and thereby made less liable to rotate, a slip is liable to occur between the motion transfer medium 6 and the rotation transform member 5. Accordingly, there is a need to increase the area of contact between the surfaces of the motion transfer medium 6 and the rotation transform member 5 while making a structure that increases the friction and renders the slip less liable to occur. To this end, the motion transfer medium 6 in the form of an elongate rope is preferably formed periodically lengthwise on its peripheral surface with a corrugation (a recess and projection). Then, it is preferred that the rotation transform member 5 be periodically formed peripherally with a corrugation (recess and projection) that fits with those formed on the motion transfer medium 6.

The present invention also provides a wave activated electric power generating system wherein the said corrugation (recess and projection) have their cross sections substantially circular having different diameters lengthwise of the motion transfer medium 6 so that they are radially (diametrically) symmetrical in a cross section thereof perpendicular to the axis of the motion transfer medium 6.

The motion transfer medium 6 if lifted up as twisted, has a cross section thereof that remains substantially circular, the periodic corrugation (recess and projections) on the motion transfer medium 6 fitting with a periodic corrugation (projection and recess) on the rotation transform member 5, thereby permitting the rotation transform member 5 to be rotationally driven and reciprocated stably by the motion transfer medium 6 without slipping between them.

The present invention also provides a wave activated electric power generating system wherein the said rotation transform member 5 so as to be fitted with the motion transfer medium 6 is formed periodically lengthwise with its outer periphery with a corrugation (projection and recess) which corresponds to the corrugation (recess and projection) formed on the motion transfer medium 6.

As mentioned above, a pulley as the rotation transform member 5 and a motion transfer medium 6 are required to be made less liable produce slipping between them. The periodic corrugation (recess and projections) on the motion transfer medium 6 are formed to correspond to, and are thereby fitted with, a periodic corrugation (projection and recess) on the rotation transform member 5, thereby converting a linear reciprocal movement of the motion transfer medium 6 smoothly into a corresponding rotational reciprocal movement of the rotation transform member 5 with an increased friction between them.

Effects of the Invention

A wave activated electric power generating system according to the present invention can be used such as on the ocean whose depth of water is not less than several ten meters, in which a buoy is set afloat on water, an electric generator of rotary type 2 secured to the buoy is principally vertically moved up and down along with the buoy on waves and in which, relative to an underwater motion restrainer used as of underwater suspension type and suspended underwater so as to be resistant to moving underwater and held substantially at rest, a weight member 7 suspended underwater is moved up and down along with the buoy and through a rope-shaped motion transfer medium 6, causing the latter to axially reciprocate, thereby causing the electric generator 2 to be driven through axial reciprocation of the motion transfer medium 6, the system having an advantage that it need not be fixed to a seafloor.

A wave activated electric power generating system according to the present invention can be used such as on the ocean whose depth of water is not more than several ten meters, in which a buoy is set afloat on water, an electric generator 2 of rotary type secured to the buoy is principally vertically moved up and down along with the buoy on waves, and in which, relative to an underwater motion restrainer used as of water bottom installation type and that has an increased weight so as to be sunk on a seafloor and thus held substantially at rest, a weight member 7 suspended underwater is moved up and down along with the buoy and through a rope-shaped motion transfer medium 6, causing the latter to axially reciprocate, thereby causing the electric generator 2 to be driven by and through axial reciprocation of the transfer medium 6, the system having advantages that it need not be fastened to a seafloor; it simply suffices to submerge an underwater motion restrainer connecting to anchor, and the system is of a simple structure, permitting an electric power to be generated at an increased efficiency.

In a wave activated electric power generating system according to the present invention, an electric generator 2 is structured to fix to the buoy, to position essentially above water, and to cover with a casing 200 so as not to be exposed to water, the system having advantages that it is fee from electrical leakage and it is durable and persistent.

In a wave activated electric power generating system according to the present invention, the casing 200 may as needed be hermetically sealed to provide an advantage that it can be used as a buoy as well.

A casing 200 floating on water (corresponding to a buoy 1) and a buoy 10 can be made sufficiently smaller than a wavelength of wave undulations so as to be moved vertically substantially along with wave undulations whereby if exposed to a storm such as a typhoon, advantageously it can hardly be broken.

In a wave activated electric power generating system of the invention, a motion transfer medium 6 from which a weight element 7 suspends and to which is secured an underwater motion restrainer held substantially immobile, is in the form of an elongate rope or belt, the motion transfer medium 6 being guided so as to be movable within a limited extent by a guide means 80, 81 (having a limiting or guiding function) which makes it less liable to come off a pulley of the rotor of an electric generator 2 if the buoy is inclined. Furthermore, the motion transfer medium 6 is thin and flexible so that it may be less influential from waves and water, restorable if deflected, less resistant to water and small in cross section of collision by an underwater suspended matter. Moreover, the motion transfer medium 6 by being oscillated vertically up and down, makes matters or things such as shells less attachable thereto and they if attached to the medium 6 can be removed therefrom by the guide means 80, 81 (having a foreign matter removing function), offering the advantage that it is rendered capable of moving smoothly with waves for an extended period of time.

A wave activated electric power generating system of the pre-sent invention allows an electric generator of rotary type to be used therein wherein using an elongate, rope-shaped or belt-shaped motion transfer medium 6 operated as described facilitates converting its axial reciprocation into a rotational reciprocation of the rotor, generating an alternating current with readiness. Accordingly, without the need to provide the generator with a mechanism that causes it to rotate in a selected direction, a wave activated electric generating system is provided having advantages of simple structure, minimum failure and enhanced durability.

A wave activated electric power generating system of the present invention presents an advantage that according to a size of waves at a site of its installation, a distance between the weight element 7 and the underwater motion restrainer can be adjusted by suitably selecting the length of the elongate rope- or belt-shaped motion transfer medium 6.

In a wave activated electric power generating system of the present invention unlike in a conventional turbine generator operated with an air stream, a large buoyancy by water such as seawater whose specific density is high can be obtained with facility through a buoy. Thus, the system has high energy density and can accordingly be made smaller. Also, using ocean waves that occur by day and night, the system generates an extremely high electrical energy. Further, the system is also advantageous in that an ordinary electric generator of rotary type can be used, permitting electric power to be generated in a simple, uncomplicated or unsophisticated structure.

A wave activated electric power generating system of the present invention which allows high buoyancy by water such as seawater whose specific density is high to be obtained easily with a small buoy is advantageous in that the speed of rotation of the rotor of an electric generator 2 can be increased easily with a speed of rotation transform mechanism (a rotational speed transform mechanism) 9.

In wave activated electric power generating system of the present invention, using an elongate rope-shaped motion transfer member 6 formed periodically lengthwise on its surface with a corrugation (recess and projection) and a rotation transform member 5 formed periodically along its peripheral surface with a corrugation (projection and recess) fitting with the corrugation (recess and projection) formed on the motion transfer medium 6 to increase friction between the transfer medium 6 and the rotation transform member 5 allows reducing the slippage of one of them from the other, thereby achieving power generation at an increased efficiency.

In a wave activated electric power generating system of the present invention, the corrugation (recess and projection) formed periodically on the motion transfer medium 6 have their cross sections substantially circular having different diameters lengthwise of the motion transfer medium (6) so that they are radially (diametrically) symmetrical in a cross section thereof perpendicular to the axis of the motion transfer medium (6). Thus, the motion transfer medium 6 so formed remains unchanged in shape if it is twisted should the buoy, the weight element 7 and/or the underwater motion restrainer be rotated with waves. The corrugation (recess and projection) of the motion transfer medium 6 if it is twisted is fitting with the corrugation (projection and recess) on the rotation transform member 5, preventing the motion transfer medium 6 from coming off the rotation transform member 5.

Figure 1:
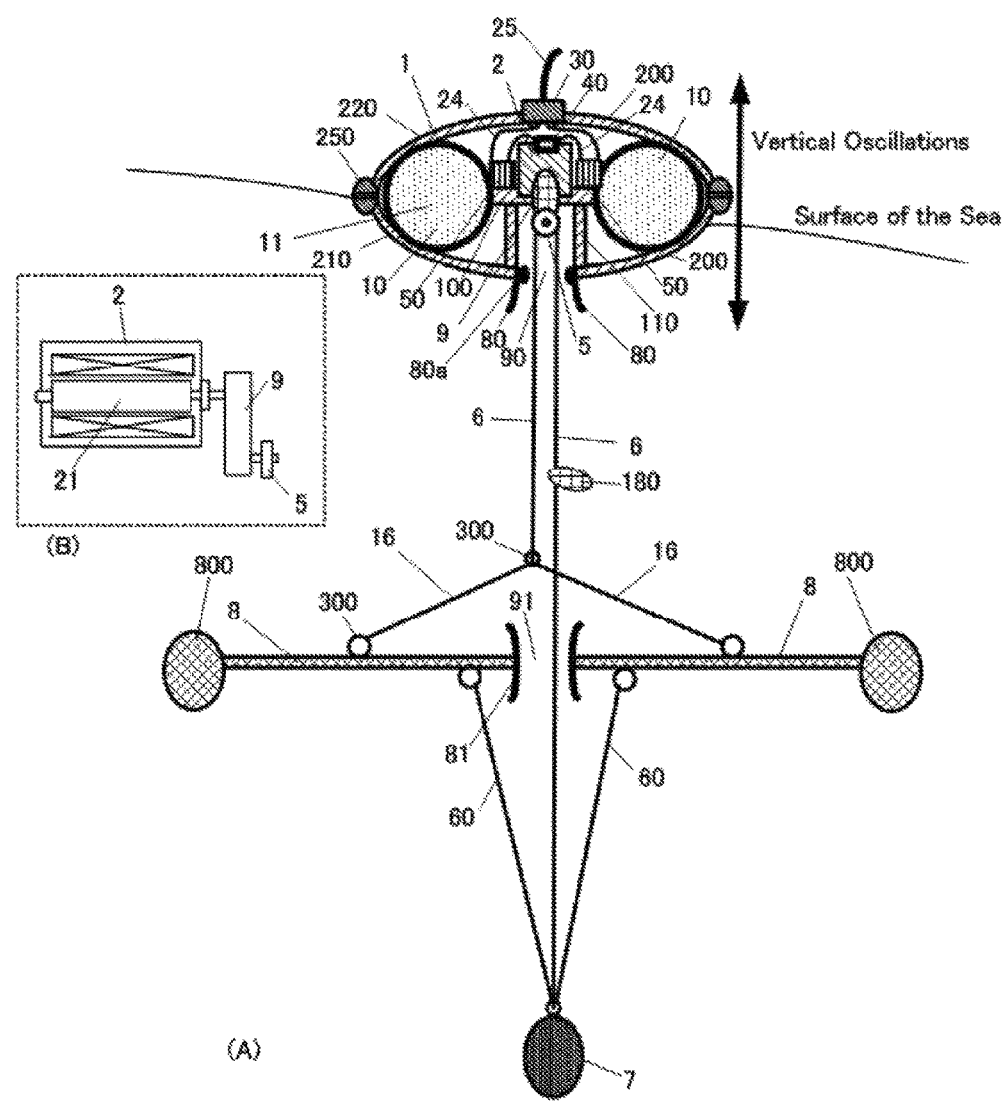
FIG. 1A is a diagrammatic makeup view illustrating one form of implementation of the basic makeup of a wave activated electric power generating system of the present invention for explanation of its operation, the form of implementation being of underwater suspension type in which a underwater motion restrainer is suspended in water (Example 1)
FIG. 1B schematically illustrates the electric generator 2, the rotation transform member 5, the rotation transform mechanism (the rotational speed transform mechanism) 9, and the rotor 21, with a cross section of the rotor (21) in the electric generator (2) also schematically shown.

DESCRIPTION OF REFERENCE CHARACTERS 1 1a, 1b, 10 buoy
2 electric generator
5 rotation transform member
6 motion transfer medium
7 weight element
8 underwater motion restraining board
9 speed of rotation transform mechanism
11 filler
12 underwater motion restraining block
15 belt
16 supporting wire
21 rotor
24 wiring
25 cable
30 connector
40 rectifier
50 battery
60 wire
65 mooring rope
70 anchor
80, 81 guide means
80a guide projection
85 pulley
90, 91 hole
100 supporting table or holder
110 partition
200 casing
210 casing body
220 casing lid
250 cover joint
300 latch
510 pulley guide
520 pulley periphery
550 shaft
600 periodic corrugation (recess & projection)
700 yoke
800 peripheral projection

MODES FOR CARRYING OUT THE INVENTION

With reference to the Drawing Figures, a detailed explanation is given, hereinafter, of forms of implementation of a wave activated electric power generating system of the present invention as well as a motion transfer medium and a rotation transform member for use therein, which system, medium and unit can be manufactured by the conventional techniques.

Example 1

FIG. 1 is a diagrammatic makeup view illustrating one example of implementation of the basic makeup of a wave activated electric power generating system of the present invention for explanation of its operation, the example of implementation being of underwater suspension type in which an underwater motion restraining board 8 is suspended in water while the system is floating on the sea to perform an operation. In this Example, a buoy 1 having therein a filler 11 whose density is sufficiently lower than that of water is equipped with an electric generator of rotary type 2 securely connected to a supporting stand or holder 100. The electric generator 2 has a rotor 21 (FIG. 1B) whose rotation causes the generator 2 to generate an alternating current. Through the intermediary of a speed of rotation transform mechanism (a rotational speed transform mechanism) 9 directly connected to the rotor 21, the rotation of a pulley as a rotation transform member 5 is designed to rotate the rotor 21 at a raised speed of rotation. The rotor 21 is rotated at a speed of rotation that is, for example, ten (10) times higher than that of the pulley in causing the generator 2 to generate an alternating current. In this form of implementation, the buoy 10 and also the generator 2 are covered with a casing 200 is the case that from sea water they are hermetically sealed with the casing 200 which while serving as a hermetic seal, acts also as a buoy 1 (float) afloat on the sea water. Thus, the buoy in this Example is, for the sake of safety, double structured of a buoy 1 by the casing 200 and a buoy by a buoy 10 containing the filler 11. This provides for a safe structure that even if the casing 200 is broken by a storm such as typhoon to let sea water come in, a buoy 10 filled with the filler 11 which is sufficiently lower in density than water is arranged not to sink underwater if its surface is somewhat damaged. The rotation transform member 5 is here in the form of a pulley, from which through a motion transfer medium 6 here in the form of a flexible rope there are suspended underwater a weight element 7 tied at its one end and an underwater motion restraining board 8 tied at its other end through a supporting wire 16 and a latch 300. And, the underwater motion restraining board 8 has such a horizontal spread as to increase resistance by water to, and thereby restrains, its upward and downward vertical movement with the waves. The underwater motion restraining board 8 is thus set in the state that it is left at a halt underwater. In the sea water, it is known that the region of a depth of one half or more of the wavelength of undulations or swells of waves from the waterline, where a swell or undulating portion of waves due to rotational motion of wave water in the vicinity of the surface of the sea is markedly reduced (and the radius of the rotational movement is markedly reduced), constitutes a region in which the effect of undulations or swells on almost all ocean waves can much be disregarded. At a depth in such a region, the underwater motion restraining board 8 is held horizontally.

An underwater motion restrainer is composed of the underwater motion restraining board 8, the supporting wire 16 and the latch 300.

The weight element 7 and the underwater motion restrainer are tied together by a wire 60 so that they may not be spaced too apart from each other.

An operation in summary is described below of a wave activated electric power generating system of underwater suspension type shown in FIG. 1. Responsive to undulations in ocean waves, the electric generator 2 secured to the casing 200 acting also as the first buoy 1 and to the second buoy 10 disposed therein is moved up and down vertically and also right and left horizontally on the surface of the sea, together with these double buoy 1, 10. The underwater motion restraining board 8 in seawater is configured to restrain itself under resistant water from moving along with wave undulations, this causing the weight element 7 to move up and down vertically which is connected thereto through the motion transfer medium 6 in the form of a flexible rope. Then, the flexible rope as the motion transfer medium 6 is reciprocated, moving vertically up and down to an extent corresponding to a height of wave undulations. If the ocean waves have an amplitude of, e.g. 2 m, the motion transfer medium 6 is vertically moved up and down or reciprocated at amplitude of about 2 m. The electric generator 2 is operated by rotational reciprocation of a pulley in the rotation transform member 5 coupled to the motion transfer medium 6, thereby generating an alternating current power.

In this Example, the rotary electric generator 2 generating an alternating current (AC) is provided with a rectifier 40 for rectifying the AC generated and converting it into a direct current (DC) and further with a battery 50 that can be charged with the direct current. The rectifier 40 and the battery 50 are stored in the casing 200 acting also as a buoy so that they may be protected from seawater. In order to take out a generated electric current into the outside, a waterproof cable 25 may be provided to transmit the electric current to a land or such via a connector 30 mounted in and on the sealing casing 200. In this form of implementation, the DC power charged on the battery 50 via a wiring 24 may be transmitted using the cable 25. Alternatively, of course, the AC power generated may, as it is, be transmitted through the cable 25 to a land or such. Also, a plurality of wave activated electric power generating systems as shown may be arranged to float on the sea to generate output electric powers which can be brought together into a single output which may be transmitted through the single cable 25.

By using or without using the cable 25, a lighting device that can be energized by the generated power may be mounted on the buoy 1 and utilized as an indicator, lighthouse or the like. Also, without power transmission over a long distance, so that electric power may be taken out into the outside via the cable 25, the casing may be provided with a special connector highly water-resistant and so that, for example, it can be used as an energy base for replenishment of electric energy for sailing ships and vessels, a wave activated electric power generating system of the present invention may be arranged set afloat everywhere on the ocean.

Also, in this form of implementation, the casing 200 in the hermetically sealing system may be divided into a casing body 210 lower and a casing lid 220 upper which can be closed at a casing joint 250 for their sealing. Also, as the surface of the sea sways, the flexible rope-shaped motion transfer medium 6 suspended in the sea water is swayed as well. So that it may not be contacted by the flexible rope motion transfer medium 6, the casing 200 of hermetic seal is formed in its lower part with a hole 90 where there is mounted thereon a guide means 80 for guiding and accepting the motion transfer medium 6 with a reduced friction and so that such in a stormy sea as in a typhoon, too, the two lines of the motion transfer medium 6 may not be too apart from each other and not to cause the flexible rope motion transfer medium 6 to come off the pulley 5 attached to the electric generator 2 (limiting or guiding function). Also, a guide means 81 so that the buoy and the weight element 7 may not be made too apart from each other in a stormy sea is attached to the underwater motion restraining board 8 in the form of a plate suspended in water (limiting or guiding function). Further, where there are deposits or foreign matters from a shell, seaweed and suspended matters in the sea that may be deposited on an area of the motion transfer medium 6 which is flooded with sea water, the guide means 8 may be provided positively or optionally with a guide projection 80a attached thereto in the form of a ring to remove such deposits or foreign matters (function to remove foreign matters). Of course, a selection of the dimensions of the hole 90 for the guide 80 may eliminate the need to provide the guide projection 80a. The guide means 81 provided in a hole 91 may be given a foreign matter removal function if the hole 91 is reduced in size as required. Also, a partition 110 and the supporting table 100 constitute a structure which ensures that sea water may not enter the upper room in the casing 200 which hermetically seals the electric generator 2 and others.

Also in this form of implementation, the underwater motion restraining board 8 in the form of a plate suspended in sea water is formed centrally with the hole 91 through which the flexible rope 6 as the motion transfer medium 6 is passed having the weight element 7 tied at its other end and suspended in seawater whereby the motion transfer medium 6 is vertically reciprocated together with waves within a limit of the guide means 81 defining the hole 91. The rotation transform member 5 of the electric generator 2 and the motion restraining board 8 are equipped with guide means 80 and 81 for the motion transfer medium 6 so that the latter may not come off the rotation transform member 5 even in the event of raging waves. Then, while the height of and fluctuation by waves cause the rope motion transfer medium 6 to frictionally contact with the guide means 80 and 81, the guide means 81 having the limiting or guiding and foreign matter removing factions need be of a hard and strong material and of a shape such as to reduce the friction.

The weight element 7 needs to be made heavier in weight than the underwater motion restraining board 8. When the wave is in the lowest state, the weight element 7 suspended from the buoy 1, 10 is the deepest in the sea and positioned the lowest, causing the underwater motion restraining board 8 to be drawn downwards with a wire 60 extending downwards, the wires 60 being then extended to their maximum. The distance between the weight element 7 and the underwater motion restraining board 8 is then designed not to exceed that at which the wires 60 are extended at the maximum. A rise in wave front of undulation restrains the underwater motion restraining board 8 under resistance by seawater from moving upwards, lifting up the weight element 7 while slackening the wires 60. It is thus required that a maximum wave height be estimated and the wires 60 be set at a length sufficiently longer than that.

In FIG. 1 for this Example, the underwater motion restraining board 8 is shown including a peripheral projection 800 formed around a body of the underwater motion restraining board 8 to further restrain its vertical movement underwater so that when the underwater motion restraining board 8 is being drawn or lifted up by the buoy floating on waves of water, a negative pressure is created at its lower part, generating a Karman's vortex to increase the water resistance there.

Example 2

Figure 2:
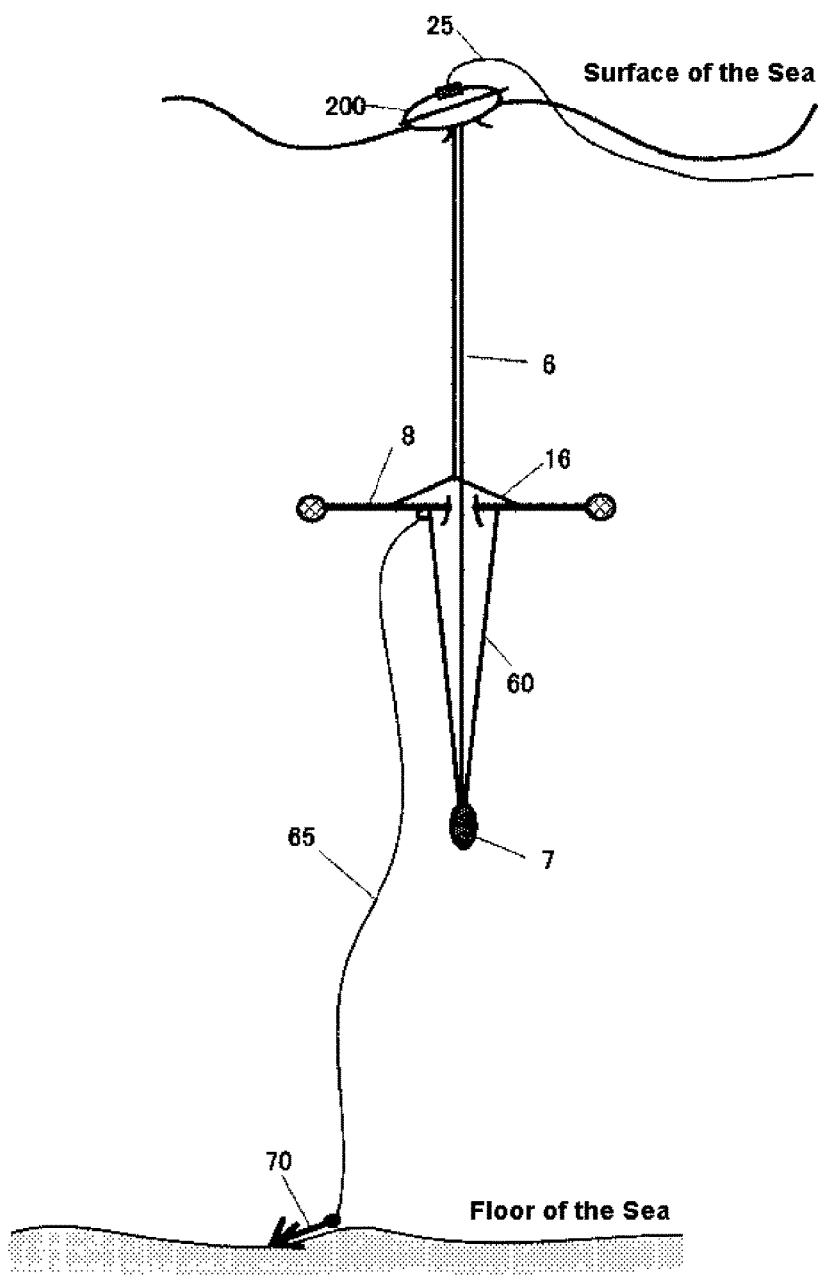
FIG. 2 is a diagrammatic makeup view illustrating another form of implementation of a wave activated electric power generating system of the present invention, the form of implementation being a system of underwater suspension type in which the system is moored onto a floor of the sea (Example 2)

FIG. 2 is a diagrammatic makeup view illustrating a form of implementation of a wave activated electric power generating system of the present invention, which is of underwater suspension type as shown in FIG. 1 and described in Example 1 above, and further in which the underwater motion restraining board 8 in the system floating on sea water is moored onto a floor of the sea by using an anchor 70 connected through a mooring rope 65 to the underwater motion restraining board 8.

Of course, mooring is not only onto a floor of the sea but may be tied onto a quay wall, wharf or any structure formed on a land. It should be noted further that the mooring here is not to resist vertical oscillations underwater by a buoy floating on water waves but to prevent a wave activated electric power generating system of the present invention from flowing in a wind or with a flow such as the ocean current.

Example 3

Figure 3:
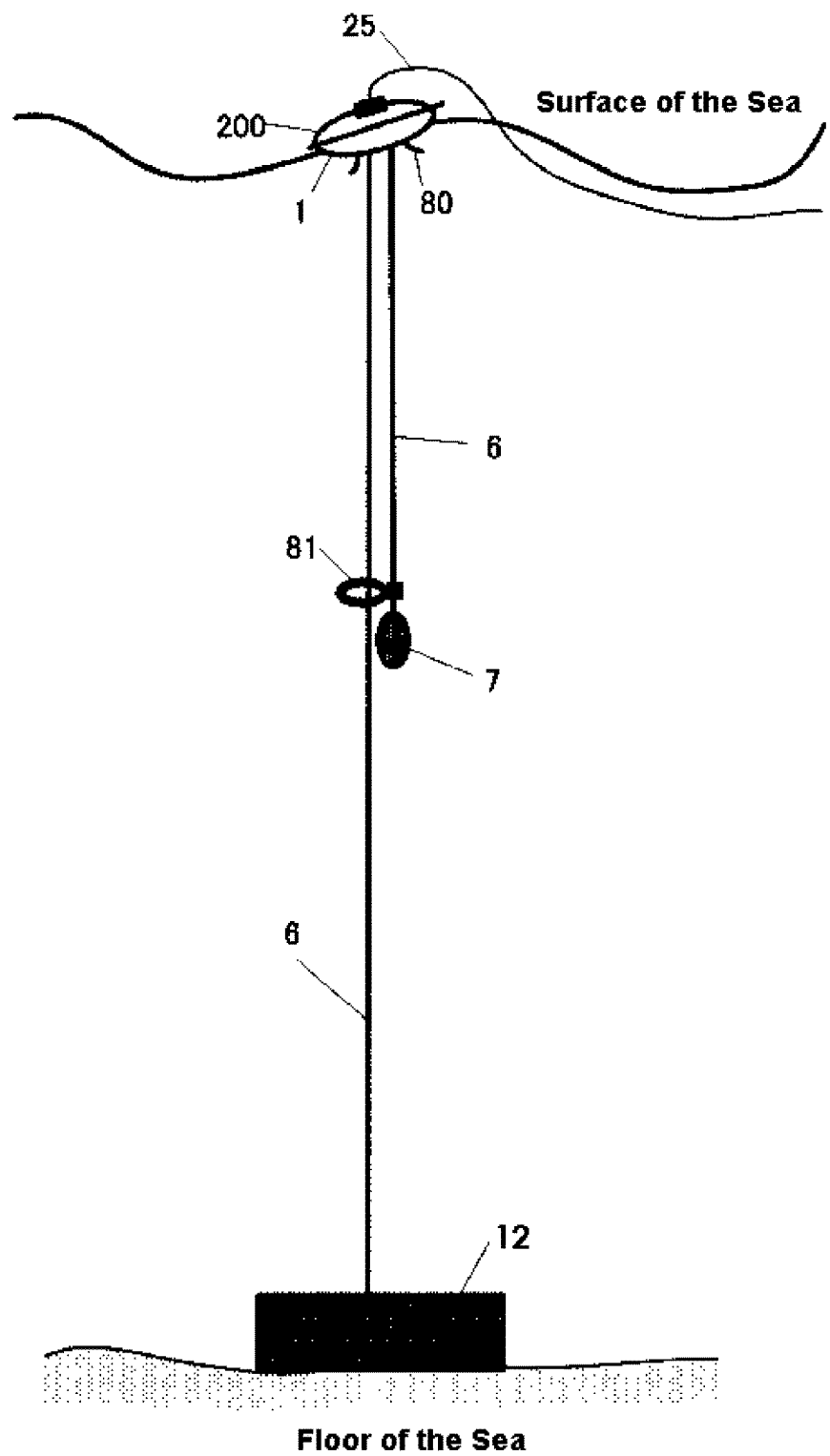
FIG. 3 is a diagrammatic makeup view illustrating one form of implementation of a wave activated electric power generating system of the present invention, wherein an underwater motion restrainer is of sea bottom installation type in which it is placed submerged on a floor of the sea (Example 3)

FIG. 3 is a diagrammatic makeup view illustrating a form of implementation of a wave activated electric power generating system of the present invention in which the underwater motion restraining block 12 is stayed submerged on a floor of the sea. This form of implementation is identical in principles of operation to those in preceding Examples 1 and 2 shown in FIGS. 1 and 2 and differs from them in that whereas in Example 1 and 2 shown in FIGS. 1 and 2, the underwater motion restraining board 8 having a spread is suspended under water resistant to its vertical movement rendering it less subject to moving vertically, in this Example of sea bottom installation type the underwater motion restraining block 12 has its own weight increased so as to be stayed submerged at a floor of the sea and immobile against vertical movement of the buoy on the waves. Of course, as in the wave activated electric power generating systems of the present invention previously illustrated in Example 1, FIG. 1 and in Example 2, FIG. 2, the underwater motion restraining block 12 is stayed or left immobile while the buoy 1 on the waves is moved vertically up and down, causing the weight element 7 through the rope or motion transfer medium 6 to be moved relatively and vertically up and down. And, through the rotation transform member 5 having this motion transfer medium 6 coupled thereto, the electric generator 2 is operated to generate electric power. Since the weight element 7 and the underwater motion restraining block 12 are tied to the motion transfer medium 6 in the form of an elongate rope, a large degree of freedom is ensured. Also, the motion transfer medium 6 being thin makes suspended matters and surges less or least influential on the system and provides an advantage that raging waves such as of a typhoon can be well endured.

In a wave activated electric power generating system of water bottom installation type according to the present invention in which the underwater motion restraining block 12 is positioned submerged on a floor of the sea, the sea floor is utilized as a stopper for the underwater motion restraining block 12 to move vertically. The wires 60 interconnecting the weight element 7 and the underwater motion restraining block 12 are then made unnecessary. And, so is the anchor for mooring. The wave activated electric power generating system of bottom of water installation type is well suited where it is installed in the ocean that is relatively shallow in depth of water.

In this case, the underwater motion restraining block 12 constitutes an underwater motion restrainer alone.

Example 4

Figure 4:
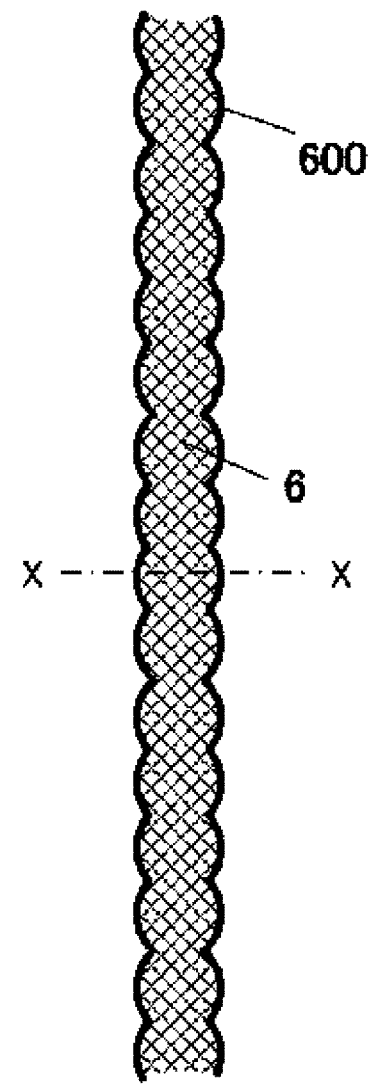
FIG. 4 is a diagrammatic sectional view illustrating one form of implementation of a motion transfer medium 6 for use in a wave activated electric power generating system of the present invention (Example 4)
Figure 5:
FIG. 5 is a diagrammatic transverse sectional view of the motion transfer medium 6, taken along the line X-X in FIG. 4.

FIG. 4 is a diagrammatic sectional view illustrating one form of implementation of a motion transfer medium 6 for use in a wave activated electric power generating system of the present invention. FIG. 5 is a diagrammatic transverse sectional view of the motion transfer medium 6, taken along the line X-X in FIG. 4. There is shown a motion transfer medium 6 in the form of a flexible and elongate rope, The rope 6 is shown formed thereon with a corrugation (recess and projection) 600 periodically along its length and so as to be circular in cross section and diametrically symmetrical as seen in FIG. 5. Thus, the elongate rope-shaped transfer medium 6 if twisted has its shape substantially unchanged, and is allowed to fit with an outer periphery of rotation transform member 5 which is so shaped with a corrugation (recess and projection) 600 periodically as to fit with the so formed rope-shaped motion transfer medium 6. Accordingly, the rotation transform member 5 can be rotationally driven substantially without slipping even if the rope motion transfer medium 6 is twisted.

Example 5

Figure 6:
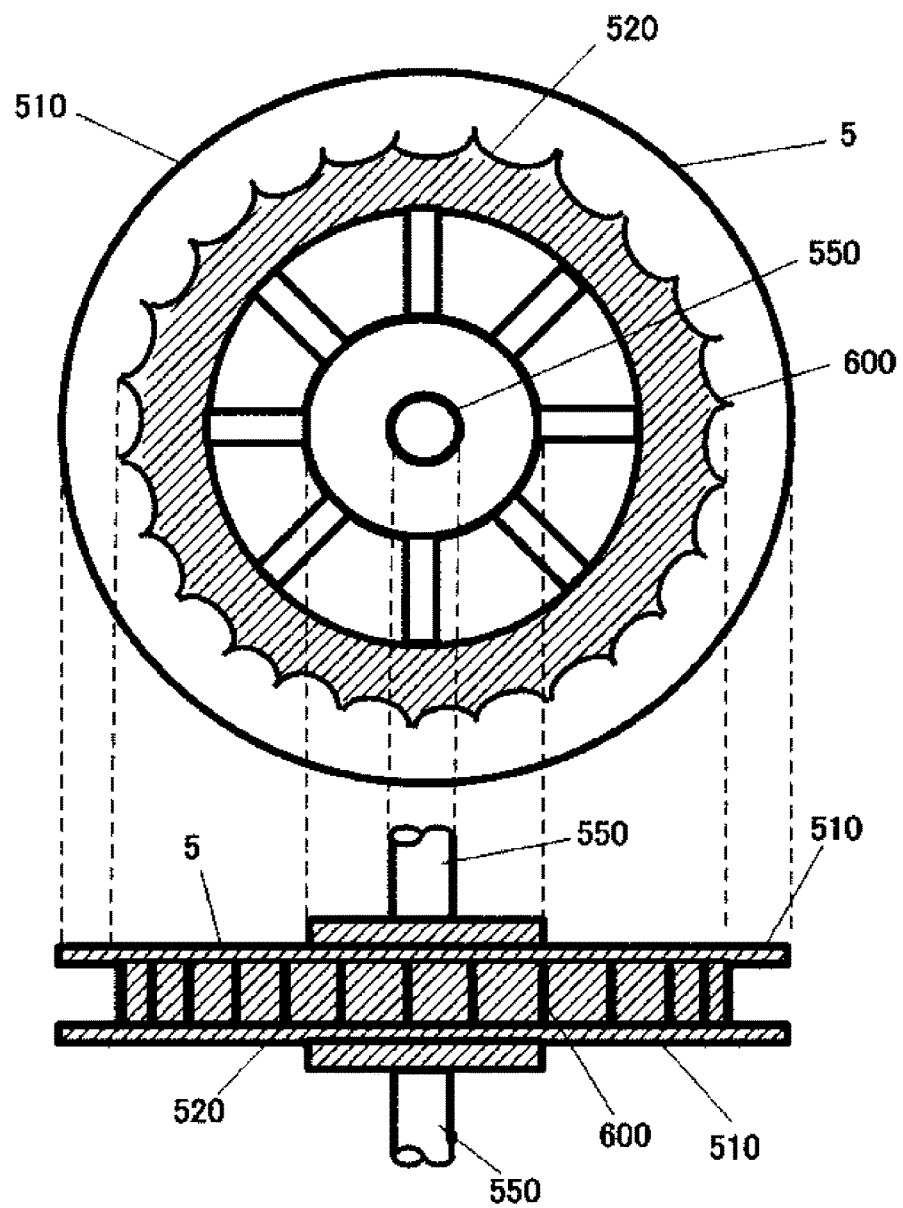
FIG. 6 is a diagrammatic view illustrating one form of implementation of a rotation transform member 5 for use in a wave activated electric power generating system of the present invention (Example 5)

FIG. 6 is a diagrammatic view illustrating one form of implementation of a rotation transform member 5 for use in a wave activated electric power generating system of the present invention. The Figure includes: a diagrammatic side cross sectional view (upper) illustrating the form of implementation of rotation transform member 5 formed periodically lengthwise around its periphery with such corrugation (recess and projection) 600 as to fit with the corrugation (recess and projection) 600 formed periodically along the length of the rope motion transfer medium 6; and a diagrammatic view (lower) of the rotation transform member 5 as so viewed from its upper that a shaft 550 of it may extend from the upper to the lower.

The rotation transform member 5 is shown in the form of a pulley which is referred to as the "sprocket" formed periodically around its outer periphery 520 with the corrugation (projection and recess) 600 that correspond to the corrugation (recess and projection) formed on the motion transfer medium 6. The pulley being such sprocket allows the motion transfer medium 6 in the form of a elongate rope to be made less liable to slip if larger force is applied thereto, providing for a wave activated electric power generating system that is efficient.

Example 6

Figure 7:
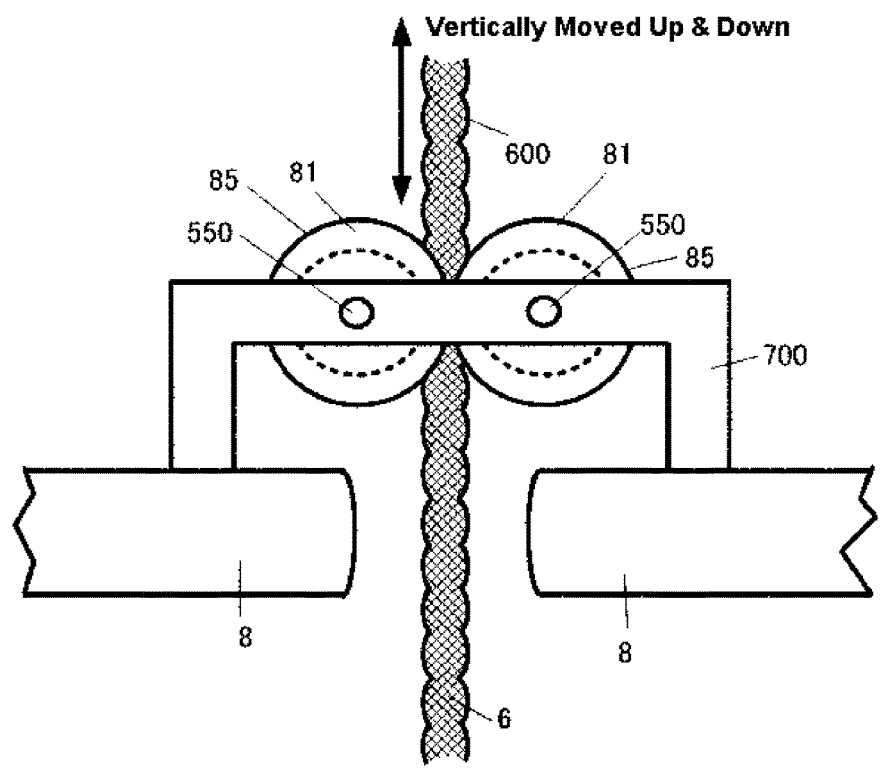
FIG. 7 is a diagrammatic view illustrating one form of implementation of an underwater motion restrainer of underwater suspension type for use in a wave activated electric power generating system of the present invention (Example 6)

FIG. 7 is a diagrammatic view illustrating one form of implementation of an underwater motion restraining board 8 of underwater suspension type for use in a wave activated electric power generating system of the present invention, in which form of implementation, the underwater motion restraining board 8 is provided with a guide means 81 which is not shaped as shown in FIG. 1 for Example 1 and which comprises a pair of pulleys 85 that are freely rotatable, having the motion transfer medium 6 in the form of an elongate rope held between them, or with the rope 6 being moved axially held between the pulleys 85. The pulleys 85 are here given the limiting or guiding function as a guide means 81 and may further be given the foreign matter removing function, by being provided, e.g., with fittings (not shown) projecting from a yoke 700.

The motion transfer medium 6 in the form of an elongate rope vertically moved with the weight element 7 is moved held between the two pulleys 85 which are made freely rotatable thereby. It would rather be preferred if their peripheral surfaces are of less unevenness so that they may smoothly be rotated having less friction. The two pulleys 85 are rotatably fastened to the stout yoke 700 mounted onto the underwater motion restraining board 8.

While in the foregoing Examples, one buoy 1 is used having an electric generator 2 built therein, the buoy 1 may be divided into a plurality of sub-buoys whose buoyant forces are added together to give a desired total buoyancy. The electric generator 2 may not necessarily be built in the buoy 1 but may be disposed separately of the split sub-buoys in a structure such that it may be moved vertically together with them. Then, it would be preferred that the electric generator 2 be covered or cased so as not to be exposed to sea water for the sake of protection from electric leakage or be in a structure that it is above the sea and not submerged in the sea.

Example 7

Figure 8:
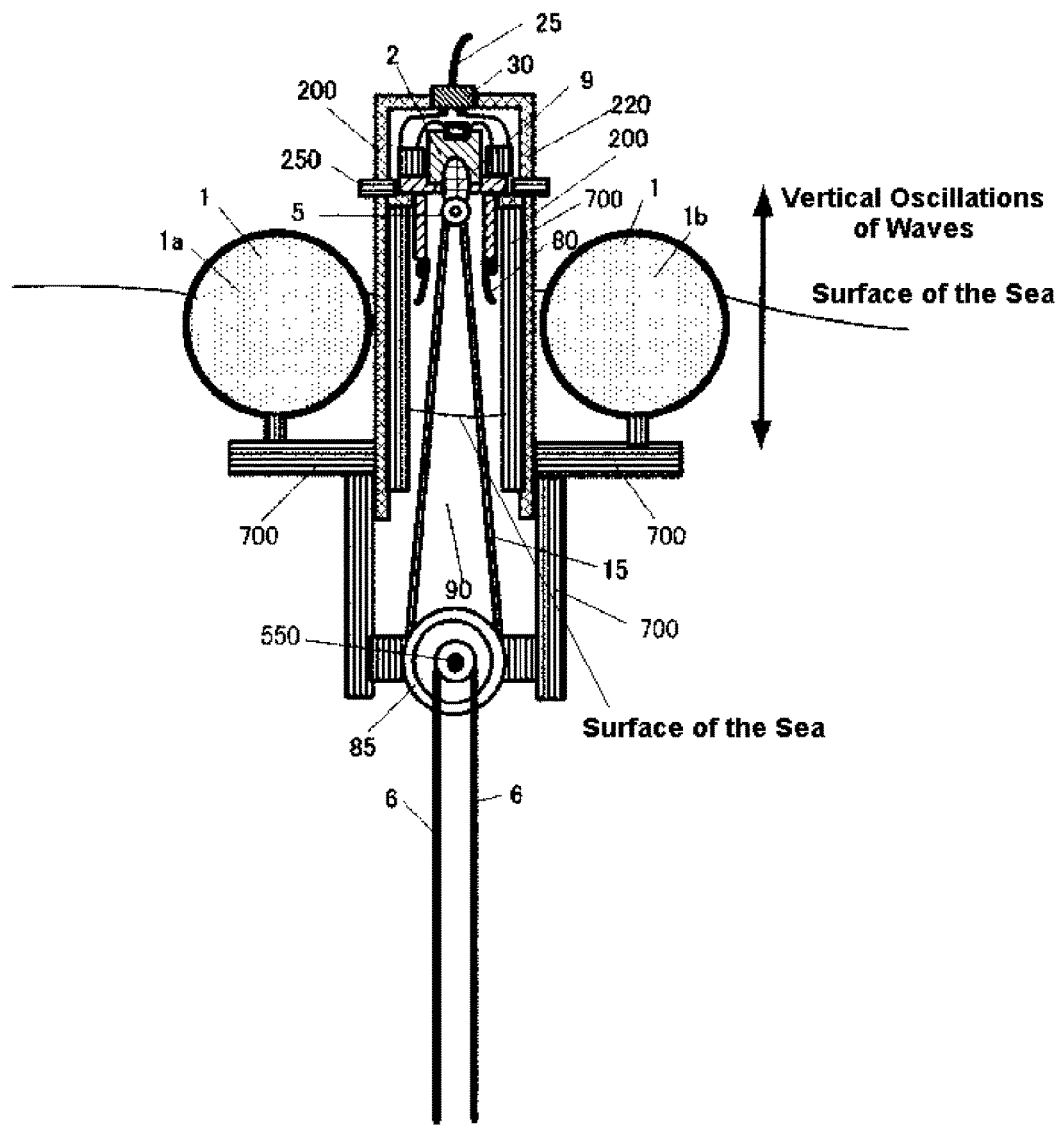
FIG. 8 is a diagrammatic view illustrating one form of implementation of a wave activated electric power generating system of the present invention in which a buoy is parted into a plurality of buoy elements 1a, 1b, (Example 7).

FIG. 8 is a diagrammatic view illustrating one form of implementation of a wave activated electric power generating system of the present invention in which a buoy 1 as in FIG. 1 for Example 1 and in FIG. 2 for Example 2 is parted into a plurality of (here, two) buoy elements 1a, 1b, which are coupled together by a yoke 700 so that a desired buoyancy may be attained. While in the forms of implementation shown in FIGS. 1 and 2, the electric generator 1 is inserted in the buoy 1, the buoy elements 1a and 1b are securely mounted on a yoke 700 for interconnecting them. Further, the electric generator 2 is securely mounted on the yoke 700 as its support. In order, of course, to achieve a stability of the system including the electric generator 2, the number of the buoys may be increased to three or four. In the present form of implementation, it should be noted that the electric generator 2 for protection from seawater or rainwater is enclosed in a casing 200 in which a region positioned above the sea (above the surface of the sea) is enhanced in airtightness and is structured not to admit or leak air. Thus, insides of the casing 200, an amount of air that exists keeps the surface of the sea pushed down always or if it is stormy and lying below the generator 2. Accordingly, the electric generator is held not to be exposed to seawater. The situation illustrated is like the state that a bottle with air therein is inverted and dipped in water in which state the bottle has an upper part filled always with air. The casing 200 has a casing lid 220 that can be removed at a casing joint 250 from the casing body, a structure which facilitates maintaining the electric generator 2.

In this form of implementation, the yoke 700 directly connected to the buoy elements 1a and 1b to support them has a pulley 85 mounted thereon that is rotatable underwater by the motion transfer medium 6 in the form of a rope. Further, in order for a speed increasing function to be added, the pulley 85 is here of a double pulley, having a first and a second pulley that are smaller and larger in radius. From the larger of the pulley 85 a belt 15 wound thereof extends to the rotor 21 of the electric generator 2 so that it can be rotated at an increased rpm. A shaft 550 of the pulley 85 is thicken sufficient to support the weight enough of the weight element 7 (not shown in FIG. 8) suspended. Further, it is ensured for the gravity of the weight element 7 not to be applied on the rotation transform member 5 such as the pulley of the electric generator 2. It is, of course, preferred that the electric generator 2 be provided therein with a speed of rotation transform member (a rotational speed transform mechanism) 9 as a rotation increasing mechanism with gears or the like. Principles and operation of wave activated power generation here are as in those shown and mentioned previously in connection with FIGS. 1 and 2, and a repeated description is omitted here. Needless to say, various modifications are possible which are substantially identical in gist, operation and effect.

A wave activated electric power generating system and a motion transfer medium and a rotation transform member for use therein in accordance with the present invention are not limited to the specific forms of implementation thereof described herein.

INDUSTRIAL APPLICABILITY

A wave activated electric power generating system according to the present invention may only be set afloat on the sea or a lake where waves are high. Vertical up and down movement of a buoy floating on undulations of the waves relative to a underwater motion restrainer that can be at a standstill underwater (underwater suspension type) or on a floor of the sea or lake (bottom of water installation type) is converted or transferred by a motion transfer medium in the form of an elongate rope vertically moving under the weight of a weight element to operate a rotary electric generator securely connected to the buoy, thereby generating electric power. Except for mooring of a degree of preventing a system from flowing with the ocean current or the like, this is a power generating system that need not be fixed to a floor of the sea, a quay wall or the like but which is of a small size and operable day and night for power generation, using a wave power of water waves that is larger in kinetic energy than in an electric generator using an air current turbine. It is a power generating system in which a buoy afloat on water such as on the sea can be made compact and which if exposed to a rainstorm such as a typhoon is less liable to break and which is durable and highly efficient. Since waves undulating slowly are utilized, it is difficult to obtain a steady output of AC generation. It is preferred that the output be rectified into a DC which is stored on a battery or the like. Also, while a generated output can be used upon transmission via a cable or the like, it can also be used to power an indicator lamp, lighthouse or the like floating on the sea. Also, an electric power generated by wave activated power generation can be utilized to electrolyze sea or fresh water to produce hydrogen. Then, for example, hydrogen generated is stored in a hydrogen occluded alloy which can be used to form an electrode in a secondary battery such as nickel—hydrogen fuel cell or to produce hydrogen gas. Hydrogen gas may be used as a fuel in producing a fuel cell or any other fuel appliance, and may be stored in a cylinder or any other implement for storage or transportation. Further, electric power generated can be transmitted by a cable to the seashore. Moreover, the invention can be contributed in and for constructing and operating a plant using oxygen produced when fresh water is electrolyzed and utilizing sodium hypochlorite as a by-product produced when seawater is electrolyzed.

What is claimed is:

1. A wave activated electric power generating system, comprising:
    a buoy to be floating on water waves,
    an electric generator (2) secured to the buoy,
    a rotation transform member (5) for rotating a rotor (21) of the generator to cause the generator (2) to generate electric power,
    a flexible and elongate motion transfer medium (6) for rotating the rotation transform member (5),
    a weight element (7) to be suspended underwater and held by the motion transfer medium (6),
    an underwater motion restrainer adapted and constructed to provide a resistance to motion underwater of the underwater motion restrainer,
    wherein said underwater motion restrainer is suspended by a weight of the underwater motion restrainer under the buoy so as to sink underwater but being lighter in weight than said weight element (7), and the underwater motion restrainer being less subject than the weight element (7) to oscillating vertically underwater, and a guide means (80, 81) for the motion transfer medium (6) moving up and down, wherein said motion transfer medium (6) has an end having said weight element (7) tied thereto, and an opposite end having said underwater motion restrainer tied thereto via a support wire (16) and a latch (300), and a flexible wire (60) tying said underwater motion restrainer to said weight element (7) so that said underwater motion restrainer and said weight element (7) may not be spaced from each other by more than a distance of a predetermined length, wherein with said buoy being undulately oscillated following an undulatory oscillation of water that creates waves, substantially no motion being created by said underwater motion restrainer under water resistance causes said weight element (7) then to be relatively moved principally vertically up and down and in turn the rotor of said electric generator (2) to be rotated for power generation, by and through the motion of said motion transfer medium (6).

2. The wave activated electric power generating system as set forth in claim 1, wherein said buoy is divided into a plurality of buoys which are coupled together to give rise to a desired buoyance, and the electric generator (2) is securely connected to said buoys coupled together.

3. The wave activated electric power generating system as set forth in claim 1, wherein said motion transfer medium (6) is in the form of an elongate rope or belt.

4. The wave activated electric power generating system as set forth in claim 1, wherein the rotation transform member (5) comprises a pulley or gear.

5. The rotation transform member for use in the wave activated electric power generating system as set forth in claim 4, wherein said rotation transform member (5) so as to be fitted with the motion transfer medium (6) is in the form of an elongate rope with a corrugation formed periodically lengthwise on a surface of the rope, and is formed periodically along an outer periphery thereof.

6. The rotation transform member as set forth in claim 5, wherein said corrugation has cross sections that are substantially circular, the cross sections having different diameters lengthwise of the motion transfer medium (6) so that they are radially diametrically symmetrical in a cross section thereof perpendicular to the axis of the motion transfer medium (6).

7. The wave activated electric power generating system as set forth in claim 1, wherein a battery is mounted for storing the direct current via a rectifier (40).

8. The wave activated electric power generating system as set forth in claim 1, wherein a cable (25) is included for taking out an electric power generated from the electric generator (2) into an outside area.

9. The motion transfer medium for use in the wave activated electric power generating system as set forth in claim 1, wherein said motion transfer medium (6) is in the form of an elongate rope with a corrugation formed periodically lengthwise on a surface of the rope.

10. The motion transfer medium as set forth in claim 9, wherein said corrugation has cross sections that are substantially circular, the cross sections having different diameters lengthwise of the motion transfer medium (6) so that they are radially diametrically symmetrical in a cross section thereof perpendicular to an axis of the motion transfer medium (6).

11. The wave activated electric power generating system as set forth in claim 1, wherein the underwater motion restrainer comprises a body with a peripheral projection (800) formed around the body, the peripheral projection (800) formed around the body providing a further restrain vertical movement underwater of the underwater motion restrainer so that when the underwater motion restrainer is being drawn or lifted up by the buoy floating on waves of water, a negative pressure is created at a lower part of the underwater motion restrainer, generating a Karman's vortex to increase the water resistance of the underwater motion restrainer.

12. The wave activated electric power generating system as set forth in claim 11, wherein said motion transfer medium (6) is an elongate rope and the rotation transform member (5) is a pulley.

13. A wave activated electric power generating system, comprising:

a buoy (1) that floats on water and is undulately oscillated following an undulatory oscillation of the water that creates waves;

a first guide (80) within the buoy (1), the first guide (80) defining a first hole (90) extending through the buoy (1);

an electric generator (2) secured to the buoy;

a rotation transform member (5) fitted to the electric generator (2), rotation of the rotation transform member (5) causing the electric generator (2) to generate electric power;

a flexible and elongate motion transfer medium (6) fitted to the rotation transform member (5), oscillatory reciprocal motion of the motion transfer medium (6) causing the rotation of the rotation transform member (5), the motion transfer medium (6) having a first end and an opposite, second end, two portions of the motion transfer medium (6) extending through the first hole (90) of the buoy such that both the first end and the second end of the motion transfer medium (6) are located below the buoy;

a weight element (7) tied to the first end of the motion transfer medium (6) and thereby held by the motion transfer medium (6) below the first hole (90) of the buoy, the weight element (7) being suspended underwater;

an underwater motion restrainer tied to the second end of the motion transfer medium (6) via a support wire (16) and a latch (300), and thereby suspended underwater, under a weight of the underwater motion restrainer, below the first hole (90) of the buoy (1), the underwater motion restrainer adapted and constructed to provide a resistance to underwater motion of the motion underwater restrainer, the weight of the underwater motion restrainer being lighter than a weight of the weight element (7) so as to be resistant to the underwater motion and less subject than the weight element (7) to the oscillating vertically underwater, relative to the motion transfer medium (6) moving up and down under the weight of the weight element (7) to thereby provide the oscillatory reciprocal motion of the motion transfer medium (6);

a second guide (81) in the underwater motion restrainer, the second guide (81) defining a second hole (91) located in the underwater motion restrainer, one of the two portions of the motion transfer medium (6) extending through the second hole (91) of the underwater motion restrainer such that in use the first end of the motion transfer medium (6) and the weight element (7) are located below the underwater motion restrainer; and a flexible wire (60) tying the underwater motion restrainer to said weight element (7) so that said underwater motion restrainer and said weight element (7) may not be spaced from each other by more than a distance of a predetermined length, an end of a first portion of the flexible wire (60) being attached to a first side of the second hole (91) and an end of a second portion of the flexible wire (60) being attached to an opposite, second side of the second hole (91), the one of the two portions of the motion transfer medium (6) extending through the second hole (91) of the underwater motion restrainer and between the first and second portions of the flexible wire (60) that tie the underwater motion restrainer to said weight element (7), wherein with said buoy being undulately oscillated following an undulatory oscillation of the water that creates waves, substantially no underwater motion being created in said underwater motion restrainer under water resistance causes said weight element (7) to be relatively moved principally vertically up and down and in turn by and through the oscillatory reciprocal motion of said motion transfer medium (6), via the rotation of the rotation transform member (5), causes said electric generator (2) to generate power.

14. The wave activated electric power generating system as set forth in claim 13, wherein said motion transfer medium (6) is an elongate rope and the rotation transform member (5) is a pulley.

15. The wave activated electric power generating system as set forth in claim 14, wherein the underwater motion restrainer comprises a body with a peripheral projection (800) formed around the body, the peripheral projection (800) formed around the body providing a further restrain vertical movement underwater of the underwater motion restrainer so that when the underwater motion restrainer is being drawn or lifted up by the buoy floating on waves of water, a negative pressure is created at a lower part of the underwater motion restrainer, generating a Karman's vortex to increase the water resistance of the underwater motion restrainer.

16. The wave activated electric power generating system as set forth in claim 13, wherein the underwater motion restrainer comprises a body with a peripheral projection (800) formed around the body, the peripheral projection (800) formed around the body providing a further restrain vertical movement underwater of the underwater motion restrainer so that when the underwater motion restrainer is being drawn or lifted up by the buoy floating on waves of water, a negative pressure is created at a lower part of the underwater motion restrainer, generating a Karman's vortex to increase the water resistance of the underwater motion restrainer.

17. A wave activated electric power generating system, comprising:

a buoy (10) to be floating on water waves, a casing (200) acting also as the buoy (1) that floats on the water waves with an upper part of the casing floating above a surface level of the water waves, an electric generator (2) that generates alternating current, the electric generator secured to the buoy and covered by the casing, the electric generator including a rotor and being stored within the casing such that the electric generator remains above the surface level of the water waves and not be exposed to water, a rotation transform member (5) for rotating the rotor (21) of the electric generator to cause the generator (2) to generate electric power, a rotational speed transform mechanism (9) that controls a speed of rotation of the rotor of said electric generator (2) to be different from a speed of the rotation of the rotation transform member (5), a rectifier (40) which rectifies the alternating current generated by the electric generator into a direct current, the rectifier being secured to the buoy, a flexible and elongate motion transfer medium (6) for rotating the rotation transform member (5), a weight element (7) to be suspended underwater and held by the motion transfer medium (6), an underwater motion restrainer adapted and constructed to provide a resistance to its motion underwater, wherein said underwater motion restrainer is a water bottom installation, said underwater motion restrainer having a weight greater than a buoyance of said buoy plus a weight underwater of said weight element (7) so that said underwater motion restrainer sinks underwater to lie on a bottom of water including a bottom of the sea, said underwater motion restrainer being made resistant and less subject to its oscillating vertically underwater under the its weight, said underwater motion restrainer includes a guide means (80, 81) for the motion transfer medium (6) moving up and down, wherein said motion transfer medium (6) has an end having said weight element (7) tied thereto, and an opposite end having said underwater motion restrainer tied thereto, and wherein, when said buoy is undulately oscillated according to an undulately oscillation of water that creates the water waves, said weight element (7) along with said motion transfer medium (6) moves principally vertically up and down and in turn the vertical up and down movement of said motion transfer medium (6) directly produces rotational reciprocation of said rotation transform member (5), and wherein the rotational reciprocation of said rotation transform member (5) is transmitted to rotationally reciprocate the rotor of said electric generator (2) thereby generating electric power from said electric generator, with the speed of rotation of the rotor of said electric generator being controlled to different from the speed of the rotation of the rotation transform member (5) by the rotational speed transform mechanism (9).

18. The wave activated electric power generating system as set forth in claim 17, wherein the casing is hermetically sealed.

19. The wave activated electric power generating system as set forth in claim 18, wherein the rectifier is located within the casing.

* * * * *